(12) United States Patent
Branscome

(10) Patent No.: US 11,354,129 B2
(45) Date of Patent: Jun. 7, 2022

(54) SYSTEM AND METHOD FOR PREDICTING LATENCY OF A VARIABLE-LATENCY INSTRUCTION

(71) Applicant: Spreadtrum Hong Kong Limited, Shanghai (CN)

(72) Inventor: Jeremy L. Branscome, San Jose, CA (US)

(73) Assignee: SPREADTRUM HONG KONG LIMITED, Shanghai (CN)

( * ) Notice: Subject to any disclaimer, the term of this patent is extended or adjusted under 35 U.S.C. 154(b) by 643 days.

(21) Appl. No.: 14/879,213

(22) Filed: Oct. 9, 2015

(65) Prior Publication Data
US 2017/0102948 A1 Apr. 13, 2017

(51) Int. Cl.
*G06F 9/30* (2018.01)
*G06F 9/38* (2018.01)

(52) U.S. Cl.
CPC .................................. *G06F 9/3836* (2013.01)

(58) Field of Classification Search
CPC .................................................. G06F 9/30145
See application file for complete search history.

(56) References Cited

U.S. PATENT DOCUMENTS

| | | | | |
|---|---|---|---|---|
| 5,555,432 A * | 9/1996 | Hinton | ................ | G06F 9/30145 712/216 |
| 5,802,386 A * | 9/1998 | Kahle | ................... | G06F 9/3836 712/215 |
| 5,958,041 A * | 9/1999 | Petolino, Jr. | ........ | G06F 9/30043 712/214 |
| 7,366,877 B2 * | 4/2008 | Augsburg | ............. | G06F 9/3842 712/214 |

OTHER PUBLICATIONS

Smith, A Study of Branch Prediction Strategies, 1981, IEEE.*

* cited by examiner

*Primary Examiner* — Corey S Faherty
(74) *Attorney, Agent, or Firm* — Finnegan, Henderson, Farabow, Garrett & Dunner, LLP

(57) ABSTRACT

A system for predicting latency of at least one variable-latency instruction, wherein a microprocessor includes at least one pipeline, the at least one pipeline having an instruction stream. The microprocessor is configured to issue at least one dependent instruction, execute the at least one pipeline to serve at least one variable-latency instruction, generate a result of the at least one variable-latency instruction, and serve the at least one dependent instruction by using the result of the at least one variable-latency instruction.

18 Claims, 8 Drawing Sheets

SYSTEM AND METHOD FOR PREDICTING LATENCY OF A VARIABLE-LATENCY INSTRUCTION

BACKGROUND

I. Technical Field

The present disclosure relates to microprocessor implementations that execute instructions in pipelined fashion.

II. Background

A microprocessor implementation may execute instructions in pipelined, or staged, fashion to optimize resource utilization and to compensate for execution time complexity that would otherwise limit throughput. This customary approach may be used to optimize throughput at the cost of unnecessary execution latency for some instructions, particularly simpler operations requiring fewer resources. Variable-latency instructions are often included in such pipelined implementations. The exact execution latency of such variable-latency instructions may span a wide range of possibilities, but the results data are necessary to begin execution of subsequent (i.e. dependent) instructions. The requirement to wait for the results data can leave execution resources underutilized, an effect that can be mitigated, particularly when a given variable-latency instruction's actual execution latency can be anticipated.

Some implementations may compensate for variable-latency execution by scheduling independent instructions for execution, either out-of-order from the same code flow, or by supporting multiple independent code flows. Some implementations may include other resources and optimizations to minimize variable-length instruction latency, or to reduce the latency variance to a narrower range of possibilities.

SUMMARY

Consistent with embodiments of this disclosure, there is provided a system for predicting latency of at least one variable-latency instruction. The system includes a microprocessor including at least one pipeline, the at least one pipeline having an instruction stream. The microprocessor in the system is configured to issue at least one dependent instruction, execute at least one pipeline to serve at least one variable-latency instruction, and generate a result of the at least one variable-latency instruction, and serve the at least one dependent instruction by using the result of the at least one variable-latency instruction.

Consistent with embodiments of this disclosure, there is also provided a method, performed by a microprocessor including at least one instruction stream pipeline, for predicting latency of at least one variable-latency instructions. The method includes issuing at least one dependent instruction, executing the at least one instruction stream pipeline to serve at least one variable-latency instruction, generating a result of the at least one variable-latency instruction, and serving the at least one dependent instruction by using the result of the at least one variable-latency instruction.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
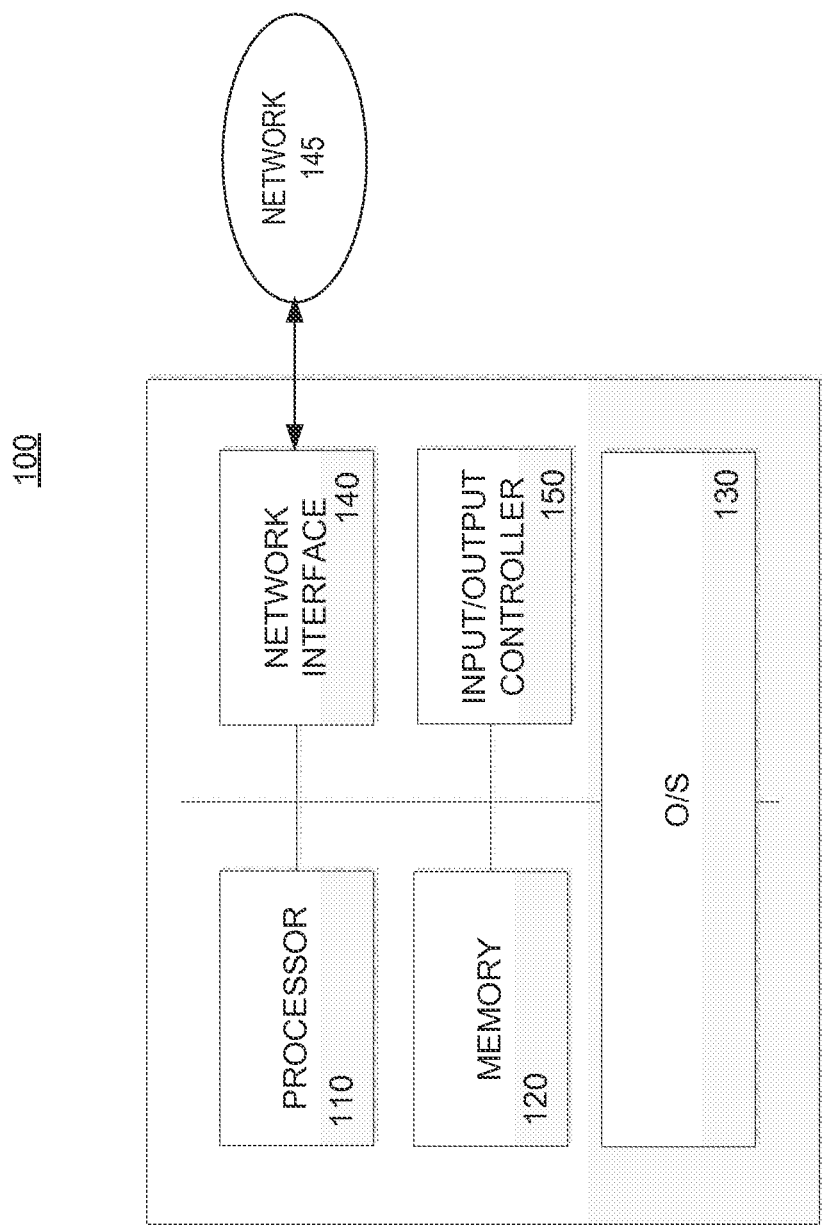
FIG. 1 is an exemplary block diagram of a system for providing efficient serial execution of variable-latency instructions according to an embodiment of the present disclosure.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Consistent with disclosure herein, there are provided a system and method for providing efficient serial execution of variable-latency instructions using one or more microprocessor pipelines. By anticipating latency prediction and executing at least one dependent instruction separately from at least one variable-latency instruction, total execution latency may be reduced with zero or minimal prediction error.

FIG. 1 is an exemplary block diagram of a system 100 for providing efficient serial execution of variable-latency instructions according to an embodiment of the present disclosure. The methods described herein can be implemented in hardware, software (e.g., firmware), or a combination thereof. In an exemplary embodiment, the methods described herein are implemented in hardware as part of a microprocessor of a special or general-purpose digital computer, such as a personal computer, workstation, or minicomputer.

In an exemplary embodiment as shown in FIG. 1, system 100 includes at least one processor 110, a memory 120, an operating system (O/S) 130, a network interface 140, and an input/output (I/O) controller 150.

Processor 110 is a hardware device for executing software, particularly software stored in memory 120. Processor 110 can be any custom made or commercially available processor, a central processing unit (CPU), an auxiliary processor among several processors associated with system 100, a semiconductor based microprocessor (in the form of a microchip or chip set), a macroprocessor, or generally any device for executing instructions. Processor 110 may include a single core or multiple core processor system with parallel processing capability. Processor 110 may use a logical processor to simultaneously execute and control multiple processes. One of ordinary skill in the art would understand that other types of processor arrangements could be implemented that provide for the capabilities disclosed herein.

Memory 120 is a hardware device and include any one or combination of volatile memory elements (e.g., random access memory (RAM, such as DRAM, SRAM, SDRAM, etc.)) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, memory 120 may incorporate electronic, magnetic, optical, and/or other types of storage media. Memory 120 may have a distributed architecture, where various components are situated remote from one another, but can be accessed by processor 110.

The instructions in memory 120 may include one or more separate programs, each of which comprises an ordered listing of executable instructions for implementing logical functions. In the example of FIG. 1, the instructions are stored in memory 120. O/S 130 essentially controls the execution of other computer programs and provides scheduling, input-output control, file and data management, memory management, and communication control and related services.

In an exemplary embodiment, system 100 can further include a network interface 140 for coupling to a network 145. Network interface 140 may include wired links, such as an Ethernet cable or the like, and/or wireless links to one or more entities e.g., using wireless protocols and technologies, such as WiFi, WiMAX, 4G Long Term Evolution, etc. Network interface 140 allows processor 110 to communicate with remote units via network 145. Network 145 can be an IP-based network for communication between system 100 and any external server, client and the like. Network 145 can transmit and receive data between system 100 and external systems. Network 145 can also be a packet-switched network such as a local area network, wide area network, metropolitan area network, Internet network, or other similar type of network environment. Network 145 may be a fixed wireless network, a wireless local area network (LAN), a wireless wide area network (WAN) a personal area network (PAN), a virtual private network (VPN), intranet or other suitable network system.

Input/output controller 150 can be configured to, for example, but is not limited to, control one or more buses or other wired or wireless connections. Input/output controller 150 may have additional elements, which are omitted for simplicity, such as controllers, buffers (caches), drivers, repeaters, and receivers, to enable communications. Further, input/output controller 150 may provide address, control, and/or data connections to external devices (e.g., key board, mouse, USB) in order to enable appropriate communications between them.

Figure 2:
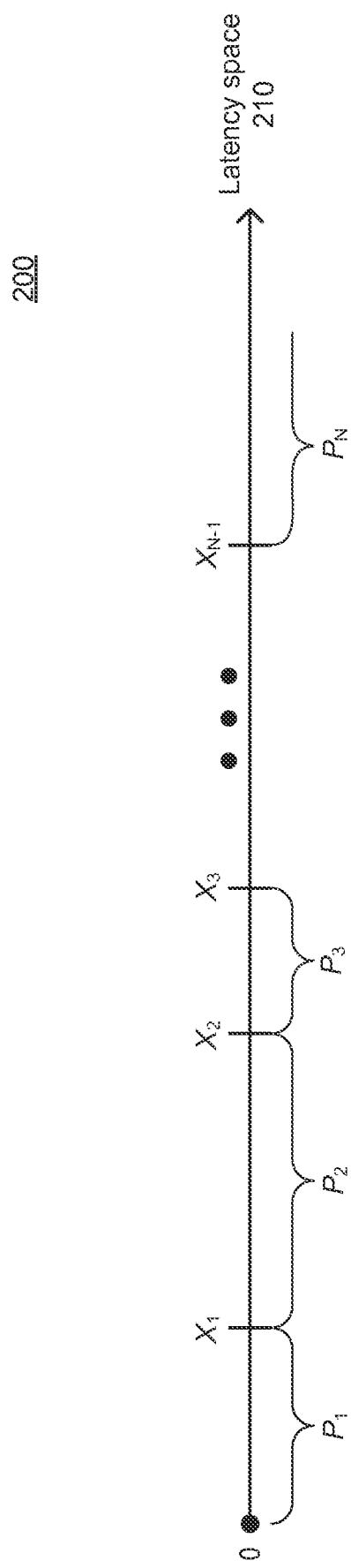
FIG. 2 is a schematic illustration of partitioning a latency space according to an embodiment of the present disclosure.

FIG. 2 is a schematic illustration 200 of partitioning a latency space 210 according to an embodiment of the present disclosure. FIG. 2 illustrates that latency space 210 is partitioned into N integer sub-ranges (e.g., delineated by $X_1, X_2, \ldots, X_{N-1}$). The values $X_i$ are integer values along an integer number line in increasing order, where i≥0. Each partitioned latency space may potentially have a different length. In an exemplary embodiment, $X_1$ may be 10 and $X_2$ may be 100, etc. Each partitioned latency space is assigned a significant value $P_i$, within a range of latency space 210. $P_i$ is a value chosen within a range $[X_{i-1}, X_i)$. For example, $P_i$ may be an average value, chosen as a best guess for a highest $P_N$. In other words, of the range from which it is chosen (e.g. $P_i = (X_i + X_{i-1})/2$), $P_N$ is chosen as a best guess from its range because it has no upper bound $[X_N, \infty)$. That is, for example, as a best estimate, $P_N$ may be chosen to be $X_N$+one-half the average width of the other ranges.

The value of $P_i$ may also be provided as a prediction whenever a variable-latency instruction is encountered. A plurality of $P_i$ values may effectively be encoded into state machine states used to make prediction as, for example, described below with reference to FIG. 3.

Each variable-latency instruction may have a sequential history of its actual latency expressed as a set of values $\{H_j\}$. Each element $H_j$ is an integer $0 \leq H_j \leq N$ with $H_j = 0$ representing an as-yet unknown history. $H_j$ takes a value $P_i$ according to what an actual latency length (L) of a variable-latency instruction was observed to be.

A depth of the sequential latency history may be characterized as M, for $0 \leq j \leq M$. The sequential latency history for a given variable-latency instruction may be used to map to a state machine. When latency of a variable-latency instruction is being predicted, its latency history $\{Hj\}$ may be, e.g., a hash mapped including additional information, to at least one independent state machine, as described more fully below with reference to FIG. 3. Additional information may include address operands in order to obtain a latency prediction P.

Once the variable-latency instruction is complete the actual execution latency of the instruction is mapped to the nearest value in the set of $\{P_i\}$ and a state machine used to obtain the prediction is updated. The obtained latency prediction of the variable-latency instruction is designated P. The index i, determined to be of the nearest value in $\{P_i\}$, is then included as a new element of the history. The determination of the taken by prediction P is described below with reference to FIG. 4.

As an example, a history is tracked to a depth of M=4 for a particular instruction, i.e., execution of the instruction has been observed at least 4 times. The actual latencies of the instruction in the 4 executions are assumed to have been {3, 110, 45, 7}, which would have been recorded as a history for the instruction; assuming that the set of $\{P_i\}$ are the average values between the set of $\{(X_i+X_{i-1})/2\}$ in FIG. 2, this instruction's history would be $\{H_j\} = \{5, 150, 55, 5\}$, where given $P_1=5$, $P_2=55$, and $P_3$ is chosen as 150.

History could also be tracked globally, not associated with a specific instruction but as a running history of all variable-length instructions encountered. In some embodiments, history may be used in combination with other identifying information such as instruction location (program counter) and type. In other embodiments, history may not be used in a mapping to a state machine.

Figure 3:
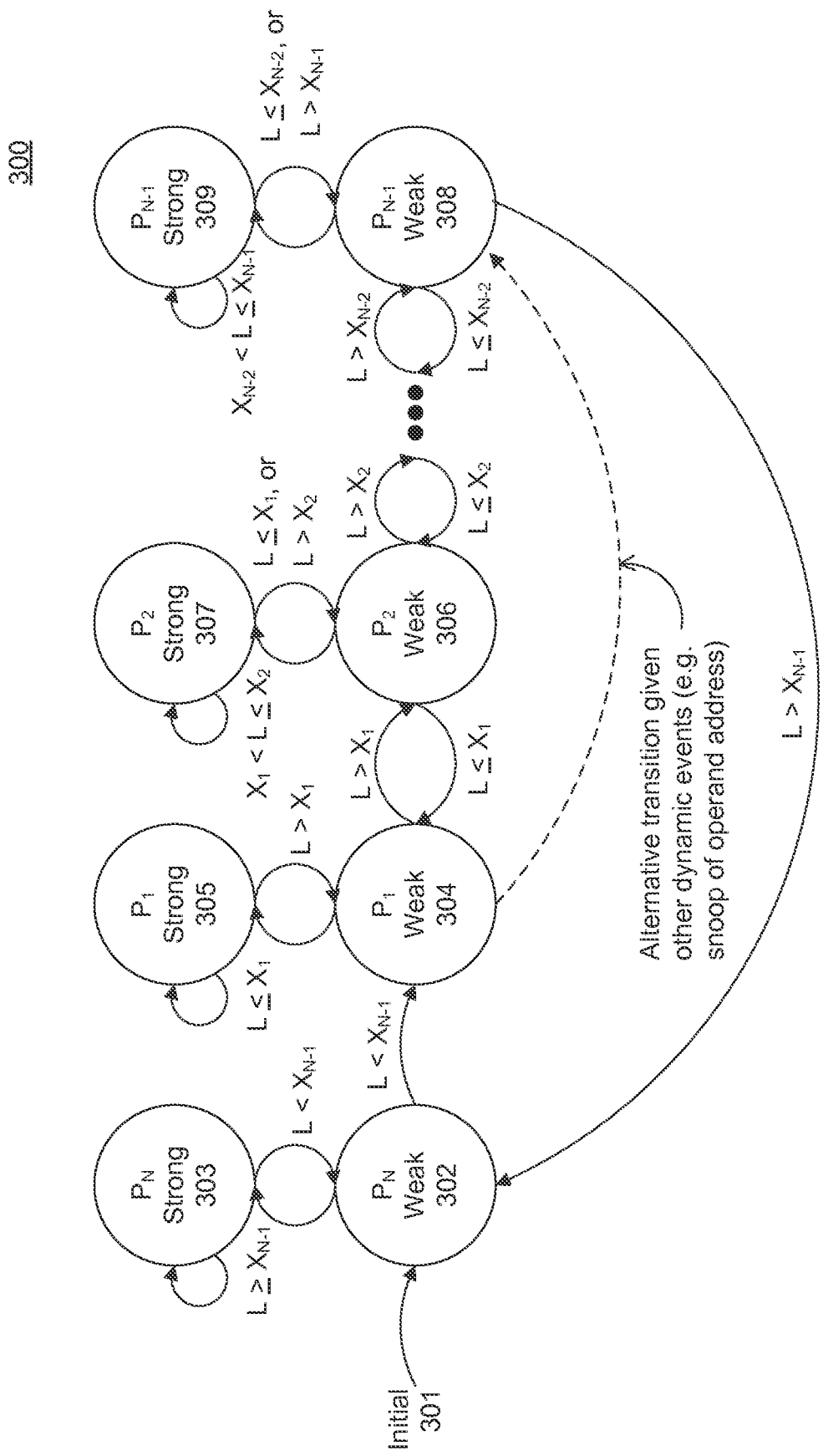
FIG. 3 is a schematic illustration of an exemplary state machine for one type of variable-latency instructions according to an embodiment of the present disclosure.

Consistent with embodiments of this disclosure, FIG. 3 shows a schematic illustration of an exemplary state machine for one type of variable-latency instructions. FIG. 3 illustrates a state machine which can be used to predict a variable-latency instruction's latency. Global or local history may be associated with a state machine, such as the state machine in FIG. 3. A current state of a state machine is used to make a latency length prediction. The current state is updated according to the observed actual latency of an instruction. State transition arcs in FIG. 3 illustrate how a value of L, which is the actual latency of the instruction is used to make a transition in the state machine. For example, an initial state 301 represents an initial point $X_0=0$. The state transitions to a $P_N$ Weak 302 from initial state 301 when an instruction is received and latency space is being partitioned from the point at $X_0=0$. When an actual latency of the instruction is less than $X_{N-1}$ at $P_N$ Weak 302, then the state transitions from $P_N$ Weak 302 to $P_N$ Weak 304. As an alternative transition, in some embodiments, the state may transition from $P_N$ Weak 304 to $P_{N-1}$ Weak 308 when other dynamic events e.g., snoop of operand address occurs. The state at $P_{N-1}$ Weak 308 may transition to $P_N$ Weak 302 if an actual latency of the instruction is longer than $X_{N-1}$. If the actual latency of the instruction is equal to or longer than $X_{N-1}$ at $P_N$ Weak 302, then the state transitions from $P_N$ Weak 302 to $P_N$ Strong 303. If the actual latency of the instruction is less than $X_{N-1}$ at $P_N$ Strong 303, then the state transitions from $P_N$ Strong 303 to $P_N$ Weak 302. In this way, a state of the state machine (e.g., among states 301-309 in FIG. 3) is updated based on the actual latency of an instruction observed and a best guess for a highest $P_N$ is chosen to make a latency length prediction.

Figure 4:
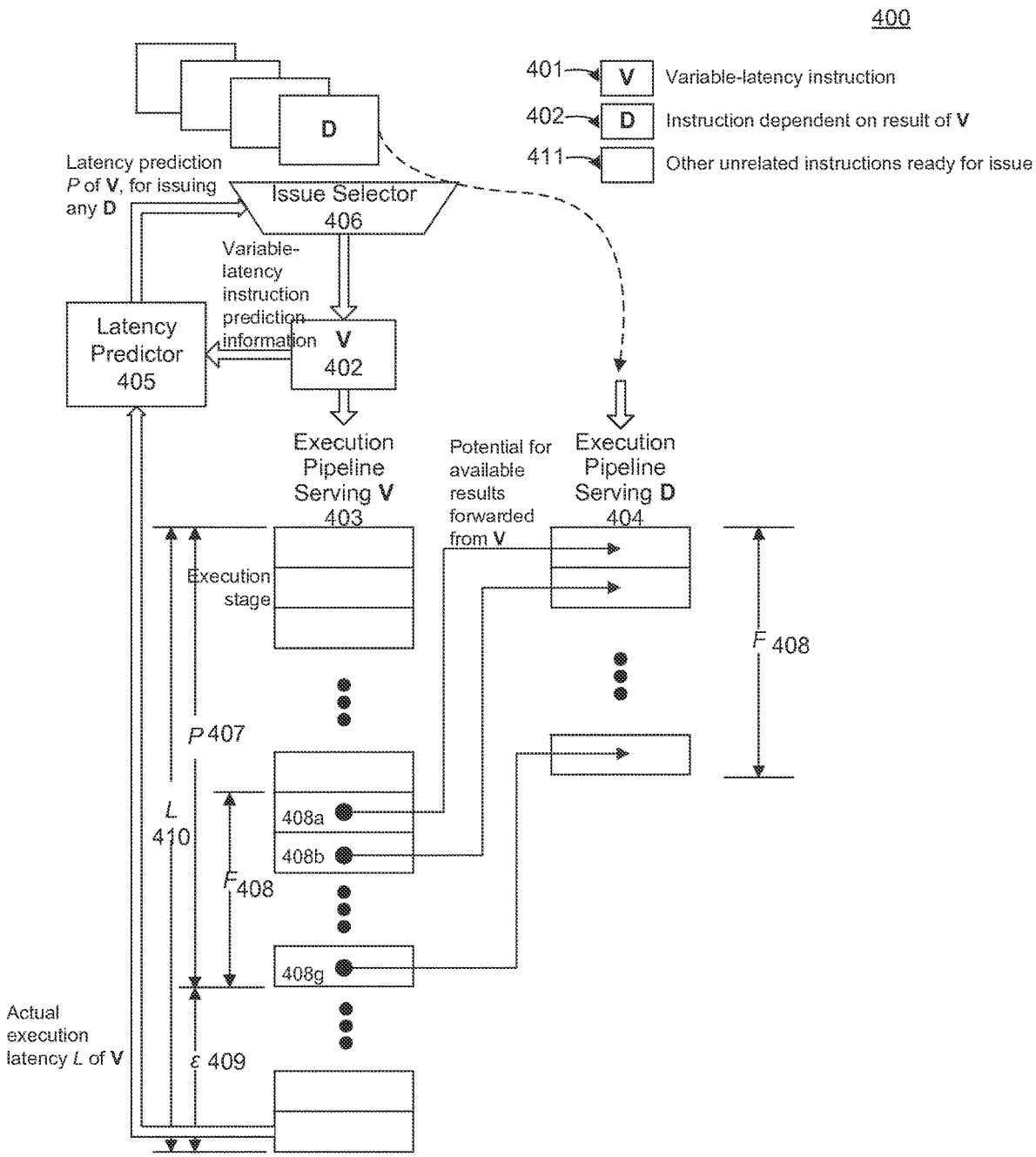
FIG. 4 is an exemplary diagram of a system for anticipating execution latency of variable-latency instructions according to an embodiment of the present disclosure.

FIG. 4 illustrates an exemplary diagram of a system 400 for anticipating execution latency of variable-latency instructions according to an embodiment of the present disclosure. System 400 includes a pipeline 403 serving a variable-latency instruction V 401 and a pipeline 404 serving a dependent instruction D 402 dependent on a result of variable-latency instruction V. One or more dependent instructions D may be executed in the same or different execution pipelines from that which executes a variable-latency instruction V. Besides two pipelines, it is also possible for one or more pipelines to serve a plurality of variable-latency instructions and instructions dependent on the results of the variable-latency instructions.

A latency predictor 405 produces at least one key result for a given variable-latency instruction V. Latency Predictor 405 may make a latency prediction P 407 based on a plurality of information. For example, Latency predictor 405 for a given variable-latency instruction may utilize and correlate global or local histories of past behaviors of one or more variable-latency instruction execution latencies. This may include latency of other unrelated instructions 411, including results of instructions affecting control flow (e.g., branches). Latency prediction may also correlate the global or local histories with additional parameter spaces, such as address or data. For example, if the variable-latency instruction is one that accesses memory, the memory address may be correlated by a multi-level hashing method. Latency Predictor 405 may receive and use variable-latency instruction prediction information in making latency prediction P 407. Latency Predictor 405 may utilize varying quantities of additional information in making latency prediction P 407, including properties of variable-latency instruction(s) such as location, history, operand values and addresses, and the variable-latency instructions themselves. Information which is used to make latency prediction may be stored and referenced in a plurality of ways, including hashing of histories, addresses, operand values, and location of variable-latency instruction within system 400. Latency Predictor 405 may receive, measure or calculate actual execution latency L of variable-latency instruction V. Latency Predictor 405 may utilize multiple techniques to optimize precision and accuracy in predicting latency, including multi-modal state, neural networks and machine learning, etc. Prediction techniques may differ for each variable-latency instruction type (i.e., there may exist different classes of instructions exhibiting variable latency), where knowledge of instruction type may influence any prediction. Parallel latency predictions may be made for a plurality of variable-latency instructions, depending on issue width. Latency Predictor 405 may send latency prediction P 407 to an Issue Selector 406. Latency prediction P 407 may include an expected deviation.

Issue Selector 406 may issue any dependent instruction D 402 in accordance with the received latency prediction P 407. When dependent instruction D 402 is issued, at the predicted time based on P 407, the system 400 determines whether results of variable-latency instruction V 401 are available. If results of variable-latency instruction V 401 become available during a time period F 408 that execution pipeline 404 serving dependent instruction D 402 is able to receive the results F 408, the actual results of variable-latency instruction V 401 are forwarded to execution pipeline 404 serving dependent instruction D 402. If the latency prediction P 407 is incorrect, a remedy is applied, as described below with reference to FIG. 8. So the results being forwarded from execution pipeline 403 serving variable-latency instruction V to execution pipeline 404 serving dependent instruction D are the actual results of variable-latency instruction V, if and when available. Once dependent instruction D is issued and results of variable-latency instruction V 401 are forwarded from execution pipeline 403 serving variable-latency instruction V 401, execution pipeline 404 serving the dependent instruction D 402 executes the dependent instruction D 402 in any one of available stages during the time period F 408. While executing the dependent instruction D 402, execution pipeline 404 may utilize the received results from the variable-latency instruction V 401.

L 410 is the actual execution latency. Latency prediction P 407 is latency predicted by Latency Predictor 405. F 408 is the time period over which, in a number of stages (e.g., 408a, 408b, . . . , 408g) dependent instruction D 402 is able to receive results of the variable-latency instruction V 401, if dependent instruction D 402 is available. The time period F 408 is generally finite. In some embodiments, F 408 can be extended indefinitely until the results of variable-latency instruction V become available (i.e., F 408 can be arbitrary). In other embodiments, execution pipeline 404 may be flushed and dependent instruction D may be recirculated back to restart execution. When latency prediction P 407 is incorrect, P 407 will be different from L 410 by an amount ε 409, that is, L=P+ε. When latency prediction P 407 turns out to be longer than expected latency, then a remedy is applied as described below.

In some embodiments, in order to reduce latency prediction error ε toward 0, feedback mechanisms may be included to monitor prediction accuracy and mitigate penalties, as necessary. This may include, e.g., dynamically enabling/disabling prediction, or relearning behavior of an instruction behavior.

In accordance with the actual execution latency L 410 measured or a latency calculated after execution of the instructions by the two pipelines 403 and 404, a variable-latency instruction is reached. This latency prediction error information is used to form a sequential history, as described above. Based on current running history, either global or local, location of the instruction (e.g., program counter or instruction pointer), and other information such as operand values and addresses, a state machine is consulted to predict latency P of the instruction. That state machine is updated according to the actual latency of the instruction.

Figure 5:
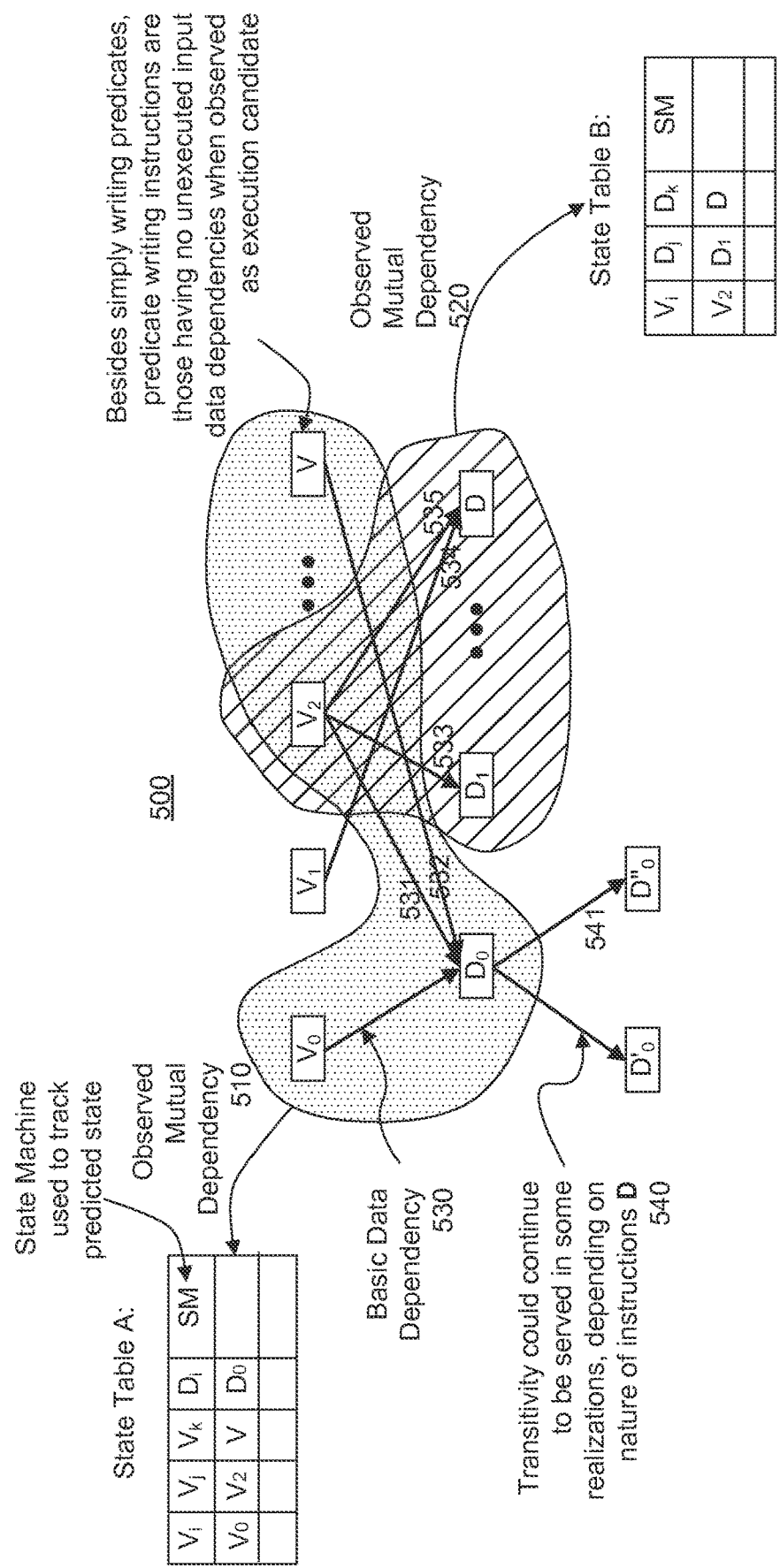
FIG. 5 is an exemplary instruction dependency graph and corresponding state tables according to an embodiment of the present disclosure.

FIG. 5 illustrates an exemplary instruction dependency graph 500 and corresponding state tables A and B according to an embodiment of the present disclosure. Presence of instructions dependent on one or more results of one or more variable-latency instructions V is detected (as a set of dependent instructions D) and predictive results are supplied. This may be performed by Latency Predictor 405. A predictive state may be established and tracked for at least each observed permutation of variable-latency and dependent instructions in a code space.

In some embodiments, a state table of instruction permutations is mapped to a state machine (e.g., State Table A). That mapping can be established by hashing various identifying data (e.g., location, history, etc.) or is a full association of the instructions, as illustrated in FIG. 5.

FIG. 5 illustrates instruction dependency graph 500 showing that a set of variable-latency instructions V and dependent instructions D exist in the code space with arbitrary dependency relationships. Observed mutual dependency 510 includes $V_0$, $V_2$, V and $D_0$. Observed mutual dependency 520 includes $V_2$, $D_1$ and D. Basic data dependencies 530, 531, and 532 represent that $D_0$ is dependent from variable-latency instructions $V_0$, $V_2$, V, respectively. Basic data dependency 533 represents that $D_1$ is dependent from variable-latency instruction $V_2$. Basic data dependencies 534 and 535 represent that D is dependent from variable-latency instructions $V_1$ and $V_2$, respectively. In some embodiments, depending on the nature of dependent instruction, for example, $D_0$, transivity can continue to be served by issuing sub-dependent instructions e.g., $D'_0$ 540 and $D''_0$ 541.

When mutual dependency is observed, a state table may be allocated to track all occurrences of instructions of these types, by their defining information (e.g., location in code space and types of instructions $V_i$ and $D_j$), mapping them to predictive states to learn their behavior. Instructions of the same type are expected to exhibit similar variable latency distributions or patterns. One type can include all instructions that access memory. Another type can include all multiply & divide instructions. Another type can include cryptographic instructions that execute complex algorithms, etc. FIG. 5 shows two State Tables A and B tracking observed mutual dependencies 510 and 520, respectively.

On initial presentation of instruction information, if an exact match of predictive information does not exist, a decision may be made between using an existing "similar" or "near" entry of a given table vs. allocating a new entry. For example, when presented with a set of instructions {$V_2$, V, $D_0$}, the illustrated entry of State Table A may be used (despite the absence of $V_0$) if the existing entries sufficiently match input characteristics. Such characteristics may include the types of the instructions, their location in code space (PC location), and their dependency characteristics. As an example, dependency characteristics can be variable-latency instructions and their dependent instructions in the same order as in a table entry.

Examples of nearness may involve proximity of instruction location, similarity of type, relative distribution of locations, etc; In such cases, the "near" entry may be used to generate an immediate prediction, while simultaneously allocating a new exact entry for further tracking A state may then be copied and tracked independently.

A given instruction may belong to multiple predictive state mappings, as they are encountered in different alignments and roles as execution candidates. For example, a given dependent instruction D may itself have variable-latency and represent a variable-latency instruction V on another occasion, tracked by a different state table entry, as instruction execution and candidate alignments may vary even when re-executing over a given code space. This phenomenon may also influence or invoke a "nearness" match and utilization of an existing state entry. For example, if a presented set of candidate instruction information is simply a column-shifted version of a state table entry's associative information, that entry may be deemed near and utilized, at least as an initial guess for establishing a new state tracking entry.

Figure 6:
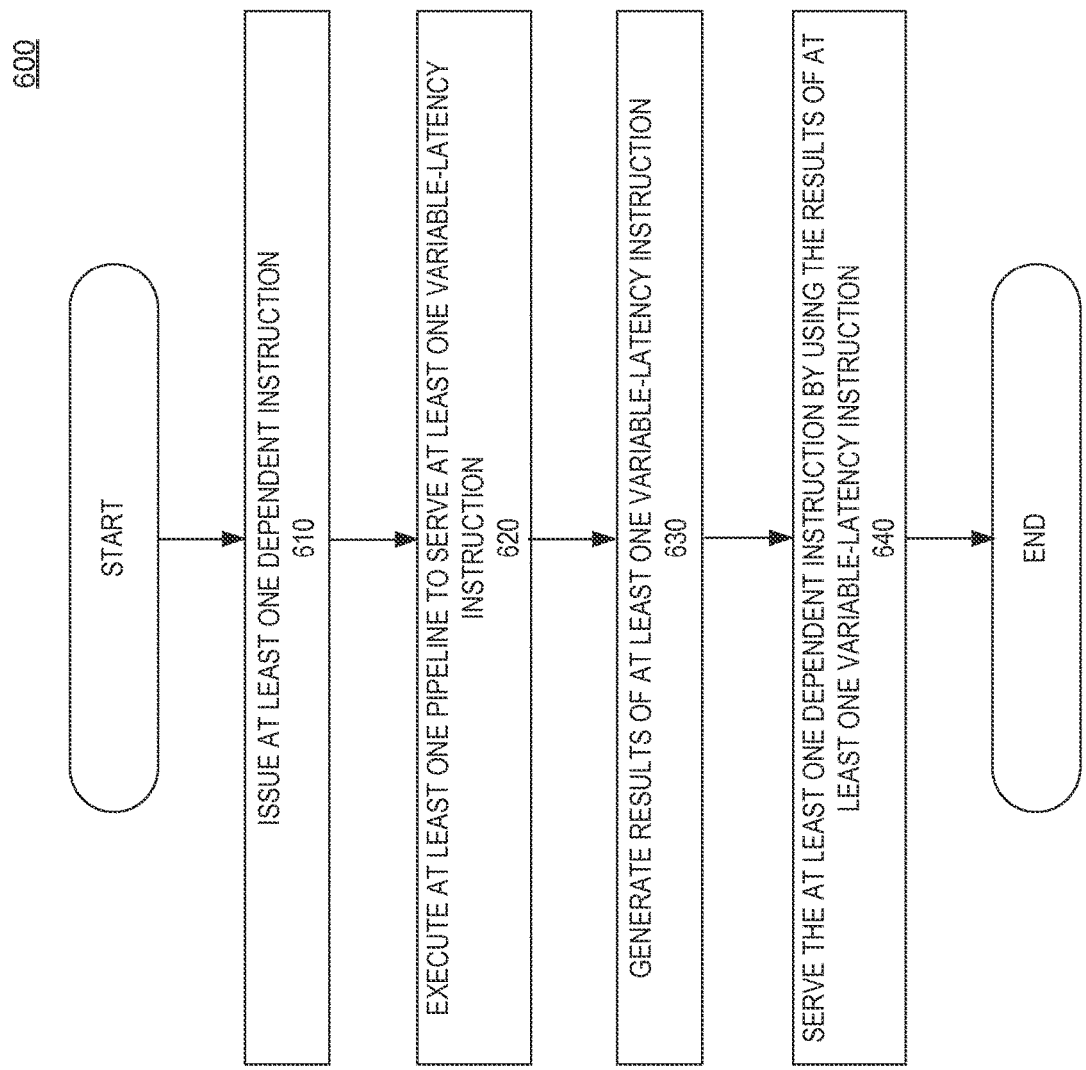
FIG. 6 is an exemplary method for executing at least one pipeline to serve variable-latency instructions according to an embodiment of the present disclosure.

FIG. 6 is an exemplary method 600 for executing at least one pipeline to serve variable-latency instructions according to an embodiment of the present disclosure. Method 600 may be executed by at least one processor. Method 600 includes issuing at least one dependent instruction which is dependent from at least one variable-latency instruction at step 610. In one embodiment, method 600 may further include issuing at least one dependent instruction based on a latency prediction of the at least one variable-latency instruction, if the latency prediction is provided. The latency prediction may be provided with an expected deviation. In another embodiment, method 600 may also include identifying a set of dependent instructions from at least one variable-latency instruction, and determining at least one dependent instruction from the identified set of dependent instructions for the purpose of issuing the at least one determined dependent instruction. It is appreciated that the issuing step 610 may be performed after executing a pipeline at step 620.

At step 620, method 600 includes executing a pipeline to serve the at least one variable-latency instruction.

At step 630, method 600 includes generating results of the served at least one variable-latency instruction. In some embodiments, method 600 may include determining the other pipeline which is to execute at least one dependent instruction. Once the other pipeline is determined, method 600 may further include forwarding the results of the served at least one variable-latency instruction to the other pipeline.

Figure 7:
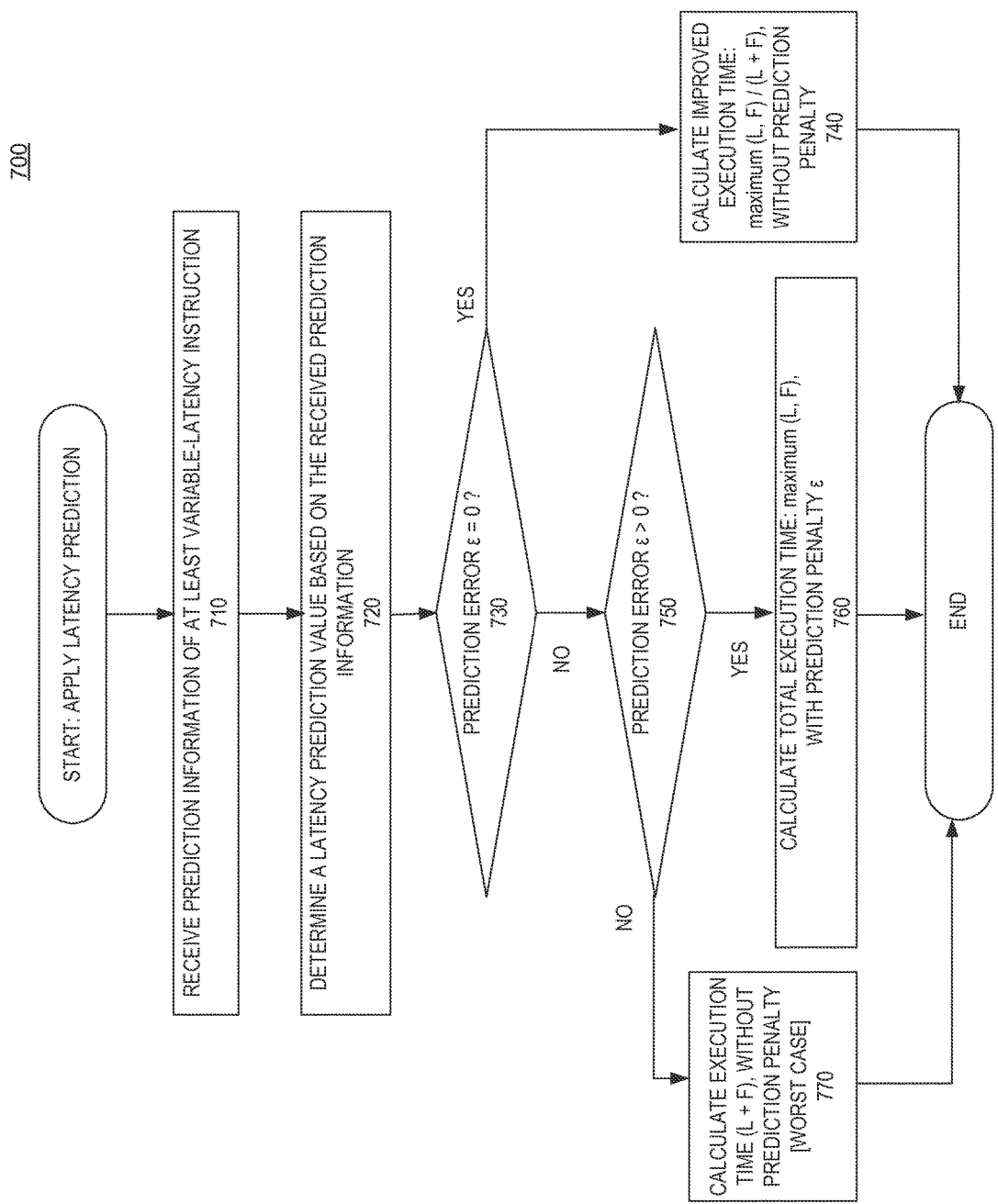
FIG. 7 is an exemplary method for anticipating execution latency of variable-latency instructions according to an embodiment of the present disclosure.

At step 640, method 600 includes serving the at least one dependent instruction by using the results of the served at least one variable-latency instruction. After executing the at least one variable-latency instruction and its dependent instruction is completed, method 600 may further determine whether to perform a latency prediction process. Without the latency prediction process, a latency penalty to the at least one dependent instruction is an actual execution latency L as illustrated in FIG. 5, making total execution latency for both variable-latency instruction V and dependent instruction D be L+F. Once it is decided to perform the latency prediction process, additional steps are performed as illustrated in FIG. 7. In some embodiments, if another pipeline is determined, method 600 may include executing the another pipeline to serve the at least one dependent instruction by using the forwarded results of the served at least one variable-latency instruction.

FIG. 7 is an exemplary method 700 for anticipating execution latency of variable-latency instructions according to an embodiment of the present disclosure. Once it is decided to perform latency prediction, method 700 includes receiving prediction information of the at least one variable-latency instruction at step 710. Prediction information may include properties of the at least one variable-latency instruction such as location, history, operand values and addresses, and the at least one variable-latency instruction itself. Method 700 may also include measuring or calculating actual execution latency L.

At step 720, method 700 includes determining a value of latency prediction P. When determining the value of latency prediction P, method 700 may use the received prediction information of the at least one variable-latency instruction.

Method 700 determines prediction error $\varepsilon$ at steps 730 and 750. With latency prediction P, the at least one dependent instruction may be issued at S=maximum (0, minimum (L, (P−F)))=maximum (0, minimum (L, (L−$\varepsilon$−F))) making total execution latency for both the at least one variable-latency instruction and the at least one dependent instruction equal to maximum (L, F) when $\varepsilon \geq 0$.

If prediction error $\varepsilon$=0, method 700 calculates an improved execution time which is maximum (L, F)/(L+F), with optimal waiting time for the at least one dependent instruction, W=S, and no penalty to other candidate instructions at step 740.

If, however, prediction error $\varepsilon$>0, method 700 calculates execution time based on maximum (L, F) with prediction penalty $\varepsilon$ at step 760.

Lastly, if prediction error $\varepsilon$<0, method 700 calculates execution time, which becomes a worst-case (L+F), because an actual execution latency L is less than latency prediction P, without prediction penalty, at step 770.

Figure 8:
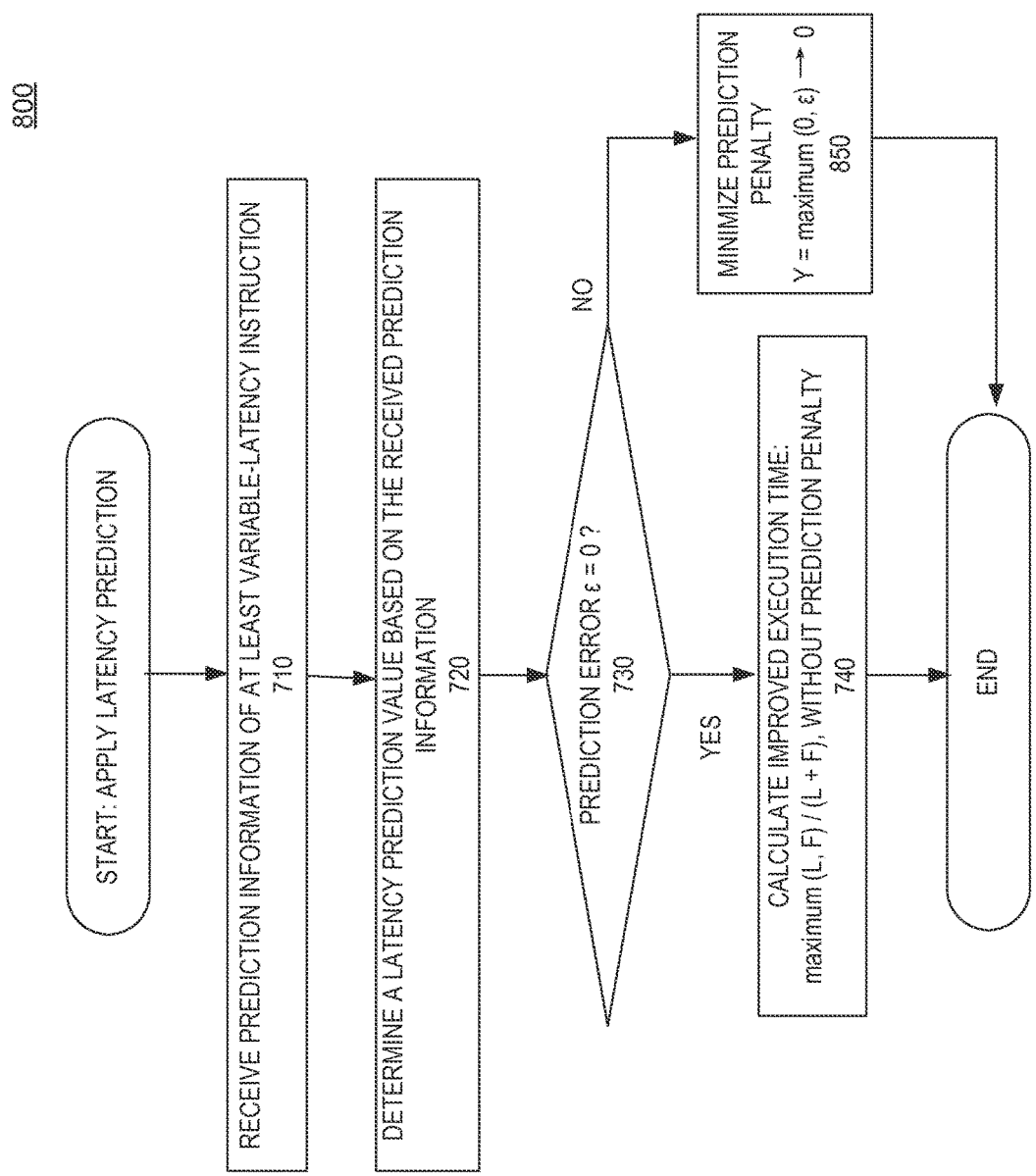
FIG. 8 is another exemplary method for anticipating execution latency of variable-latency instructions according to an embodiment of the present disclosure.

FIG. 8 is another exemplary method 800 for anticipating execution latency of variable-latency instructions consistent with steps 710-740 in FIG. 7, according to an embodiment of the present disclosure. Especially, if determining that prediction error $\varepsilon$ is not equal to 0 at step 730, method 800 further includes minimizing prediction penalty approaching to 0, that is, Y=maximum(0, e)→0 at step 850.

To minimize prediction penalty toward 0, method 800 may include optimizing waiting time W=S, and minimizing total execution time for both the at least one variable-latency instruction and the at least one dependent instruction. This can be accomplished by predicting ($|\varepsilon| \to 0$) to keep total execution time to maximum (L, F). Even for 0<$|\varepsilon|$<F, some penalty may occur, though total execution time is still better than without prediction. More particularly, e.g., when L≈F and 0≤$|\varepsilon|$<<L, a large proportional improvement can be realized.

While illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed routines may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for predicting latency of at least one variable-latency instruction, the system comprising:
    a microprocessor including at least one pipeline, the at least one pipeline having an instruction stream, wherein the microprocessor is configured to:
    produce a first latency prediction value of a first variable-latency instruction based on a state machine, wherein the state machine includes a plurality of latency prediction states and transitions between the latency prediction states, transitions between at least one pair of the latency prediction states are not allowed in the state machine, and the transitions between the latency prediction states are determined based on actual execution latencies of the first variable-latency instruction and a plurality of predetermined latency values, and wherein the state machine produces the latency prediction value based on a sequential history of the actual execution latencies of the first variable-latency instruction;
    determine that a type of a second variable-latency instruction is the same as a type of the first variable-latency instruction;
    determine a second latency prediction value of the second variable-latency instruction based on the state machine;
    issue at least one dependent instruction based on the first latency prediction value and the second latency prediction value, wherein the at least one dependent instruction is dependent on a first result of the first variable-latency instruction and a second result of the second variable-latency instruction;
    execute the at least one pipeline to serve the first variable-latency instruction;
    determine an execution time of the first variable-latency instruction;
    determine an amount of error between the execution time of the first variable-latency instruction and the first latency prediction value;
    generate the first result of the first variable-latency instruction; and
    serve the at least one dependent instruction by using the first result of the first variable-latency instruction.

2. The system of claim 1, wherein the microprocessor is further configured to produce the first latency prediction value based on variable-latency instruction prediction information.

3. The system of claim 2, wherein the variable-latency instruction prediction information includes at least one property of the variable-latency instruction.

4. The system of claim 1, wherein the microprocessor is further configured to issue the at least one dependent instruction based on the latency prediction value.

5. The system of claim 4, wherein the microprocessor is further configured to measure a time period over which, in a plurality of stages, the at least one dependent instruction is issued based on the latency prediction value.

6. The system of claim 1, wherein the microprocessor is further configured to maintain a state table of permutations of the at least one variable-latency instruction and the at least one dependent instruction mapped to a state machine.

7. The system of claim 1, wherein the microprocessor is further configured to calculate an execution time of the at least one variable-latency instruction.

8. The system of claim 1, wherein the microprocessor is further configured to determine a prediction error.

9. The system of claim 1, wherein the microprocessor is further configured to reduce a prediction penalty toward 0.

10. A method, performed by a microprocessor including at least one instruction stream pipeline, for predicting latency of at least one variable-latency instruction, the method comprising:
    producing a first latency prediction value of a first variable-latency instruction based on a state machine, wherein the state machine includes a plurality of latency prediction states and transitions between the latency prediction states, transitions between at least one pair of the latency prediction states are not allowed in the state machine, and the transitions between the latency prediction states are determined based on actual execution latencies of the first variable-latency instruction and a plurality of predetermined latency values, and wherein the state machine produces the latency prediction value based on a sequential history of the actual execution latencies of the first variable-latency instruction;

determining that a type of a second variable-latency instruction is the same as a type of the first variable-latency instruction;

determining a second latency prediction value of the second variable-latency instruction based on the state machine;

issuing at least one dependent instruction based on the first latency prediction value and the second latency prediction value, wherein the at least one dependent instruction is dependent on a first result of the first variable-latency instruction and a second result of the second variable-latency instruction;

executing the at least one instruction stream pipeline to serve the first variable latency instruction;

determining an execution time of the first variable-latency instruction;

determining an amount of error between the execution time of the first variable-latency instruction and the latency prediction value;

generating the first result of the first variable-latency instruction; and serving the at least one dependent instruction by using the first result of the first variable-latency instruction.

11. The method of claim 10, further comprising producing the first latency prediction value based on variable-latency instruction prediction information.

12. The method of claim 11, wherein the variable-latency instruction prediction information includes at least one property of the variable-latency instruction.

13. The method of claim 10, wherein issuing the at least one dependent instruction is based on the latency prediction value.

14. The method of claim 13, further comprising measuring a time period over which, in a plurality of stages, the at least one dependent instruction is issued based on the latency prediction value.

15. The method of claim 10, further comprising maintaining a state table of permutations of the at least one variable-latency instruction and the at least one dependent instruction mapped to a state machine.

16. The method of claim 10, further comprising calculating an execution time of the at least one variable-latency instruction.

17. The method of claim 10, further comprising determining a prediction error.

18. The method of claim 10, further comprising reducing a prediction penalty toward 0.

* * * * *